(12) United States Patent
Newstadt et al.

(10) Patent No.: US 9,743,040 B1
(45) Date of Patent: Aug. 22, 2017

(54) SYSTEMS AND METHODS FOR FACILITATING EYE CONTACT DURING VIDEO CONFERENCES

(71) Applicant: Symantec Corporation, Mountain View, CA (US)

(72) Inventors: Keith Newstadt, West Newton, MA (US); Ilya Sokolov, Boston, MA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/958,273

(22) Filed: Dec. 3, 2015

(51) Int. Cl.
*H04N 7/14* (2006.01)
*H04N 7/15* (2006.01)
*G06K 9/00* (2006.01)
*G06F 3/01* (2006.01)

(52) U.S. Cl.
CPC ............ *H04N 7/144* (2013.01); *G06F 3/013* (2013.01); *G06K 9/0061* (2013.01); *H04N 7/147* (2013.01); *H04N 7/15* (2013.01)

(58) Field of Classification Search
CPC ............... G06F 3/013; G06K 9/0061; H04M 3/56–3/569; H04M 2203/50–2203/509
USPC .... 348/14.01–14.16; 370/259–271, 351–357
See application file for complete search history.

(56) References Cited

U.S. PATENT DOCUMENTS

| | | | | |
|---|---|---|---|---|
| 5,500,671 A * | 3/1996 | Andersson | ............ | H04N 7/15 348/14.1 |
| 6,137,526 A * | 10/2000 | Kakii | ............ | H04N 7/144 348/14.08 |
| 6,677,980 B1 * | 1/2004 | Jeon | ............ | H04N 7/144 348/14.01 |
| 6,784,916 B2 * | 8/2004 | Smith | ............ | H04N 7/144 345/659 |
| 7,126,627 B1 * | 10/2006 | Lewis | ............ | H04N 7/144 348/14.08 |
| 7,532,230 B2 * | 5/2009 | Culbertson | ............ | G06F 3/013 345/474 |
| 8,416,715 B2 * | 4/2013 | Rosenfeld | ............ | H04N 7/147 348/14.03 |

(Continued)

FOREIGN PATENT DOCUMENTS

WO    WO 2014/194416    * 12/2014    ............ H04N 7/15

OTHER PUBLICATIONS

Ilya Sokolov, et al.; Systems and Methods for Verifying That Operators Are Human Based on Operator Gaze; U.S. Appl. No. 15/014,050, filed Feb. 3, 2016.

(Continued)

*Primary Examiner* — Hemant Patel
(74) *Attorney, Agent, or Firm* — FisherBroyles LLP

(57) ABSTRACT

The disclosed computer-implemented method for facilitating eye contact during video conferences may include (1) detecting a video conference between a user of a computing device and a remote user of a remote computing device, (2) identifying a location on the computing device's screen where the eyes of the remote user are displayed as part of the video conference, (3) creating a video stream of the user that appears to be taken from the perspective of an imaginary camera located at the eyes of the remote user, and (4) transmitting the video stream of the user to the remote computing device of the remote user. Various other methods, systems, and computer-readable media are also disclosed.

20 Claims, 7 Drawing Sheets

(56) References Cited

U.S. PATENT DOCUMENTS

| | | | | |
|---|---|---|---|---|
| 8,670,019 | B2* | 3/2014 | Byers | H04N 7/144 348/14.01 |
| 8,941,715 | B1* | 1/2015 | McNelley | H04N 7/144 348/14.16 |
| 9,270,933 | B1* | 2/2016 | Jiang | H04N 7/144 |
| 2012/0274736 | A1* | 11/2012 | Robinson | H04N 7/15 348/14.16 |
| 2015/0365628 | A1* | 12/2015 | Ben-Bassat | G06F 3/011 348/14.1 |
| 2015/0373303 | A1* | 12/2015 | Visosky | H04N 7/15 348/14.05 |

OTHER PUBLICATIONS

Patel, Neil, "8 Powerful Takeaways from Eye Tracking Studies", https://www.quicksprout.com/2014/04/16/8-powerful-takeaways-from-eye-tracking-studies/, as accessed Oct. 22, 2015, (Apr. 16, 2014).

"Online meetings and teamwork made easy", https://products.office.com/en-us/business/office-365-video-conferencing, as accessed Oct. 22, 2015, Office 365, Microsoft, (Oct. 18, 2014).

"Cisco Unified Videoconferencing 3500 Series Products", http://www.cisco.com/c/en/us/products/video/unified-videoconferencing-3500-series/index.html, as accessed Oct. 22, 2015, (Feb. 23, 2014).

"Hangouts", https://apps.google.com/products/hangouts/, as accessed Oct. 22, 2015, Google Apps for Work, (on or before Oct. 22, 2015).

"Video Conferencing using Intel® Media SDK", https://software.intel.com/en-us/articles/video-conferencing-using-media-sdk?language=it, as accessed Oct. 22, 2015, (Apr. 29, 2013).

"CatchEye", https://catch-eye.com/, as accessed Oct. 22, 2015, (Mar. 17, 2004).

"About CatchEye", https://catch-eye.com/people, as accessed Oct. 22, 2015, (Feb. 5, 2015).

Kieldsen, Sam, "Kinect lets you look your Skype caller in the eye", http://www.pcauthority.com.au/News/355066,kinect-lets-you-look-your-skype-caller-in-the-eye.aspx, as accessed Oct. 22, 2015, PC & Tech Authority, (Aug. 29, 2013).

"Videoconferencing", https://en.wikipedia.org/wiki/Videoconferencing, as accessed Oct. 22, 2015, Wikipedia, (Jan. 7, 2004).

"Streaming media", https://en.wikipedia.org/wiki/Streaming_media, as accessed Oct. 22, 2015, Wikipedia, (Jan. 13, 2004).

"Object-class detection", https://en.wikipedia.org/wiki/Object-class_detection, as accessed Oct. 22, 2015, Wikipedia, (Apr. 3, 2015).

"Facial recognition system", https://en.wikipedia.org/wiki/Facial_recognition_system, as accessed Oct. 22, 2015, Wikipedia, (Aug. 13, 2004).

"Face detection", https://en.wikipedia.org/wiki/Face_detection, as accessed Oct. 22, 2015, Wikipedia, (Aug. 15, 2004).

"Webcam", https://en.wikipedia.org/wiki/Webcam, as accessed Oct. 22, 2015, (Jan. 13, 2004).

"Eye tracking (gaze tracking)", http://whatis.techtarget.com/definition/eye-tracking-gaze-tracking, as accessed Oct. 22, 2015, (Jan. 2013).

"About Us: What Is Eyetracking?", http://www.eyetracking.com/About-Us/What-Is-Eye-Tracking, as accessed Oct. 22, 2015, (May 30, 2011).

"Eye tracking", https://en.wikipedia.org/wiki/Eye_tracking, as accessed Oct. 22, 2015, Wikipedia, (Nov. 5, 2005).

"XLabs", https://xlabsgaze.com/, as accessed Dec. 14, 2015, (Dec. 3, 2014).

"ReCAPTCHA", https://www.google.com/recaptcha/intro/index.html, as accessed Dec. 14, 2015, Google, (Apr. 17, 2014).

"Are you a human", http://demo.areyouahuman.com/, as accessed Dec. 14, 2015, (On or before Dec. 14, 2015).

Tatler, Benjamin W., et al., "Yarbus, eye movements, and vision", http://www.ncbi.nlm.nih.gov/pmc/articles/PMC3563050/, as accessed Dec. 14, 2015, Iperception, (Jul. 2010).

Archibald, Sasha, "Ways of Seeing", http://www.cabinetmagazine.org/issues/30/archibald.php, as accessed Dec. 14, 2015, The Underground, Issue 30, Cabinet Magazine, (Summer 2008).

* cited by examiner

SYSTEMS AND METHODS FOR FACILITATING EYE CONTACT DURING VIDEO CONFERENCES

BACKGROUND

Video conferencing is becoming an increasingly prevalent means of communication. Video conferencing may create an experience that is significantly more personal and interactive than audio conferencing. However, traditional technologies may obtain visual input for video conferences from cameras placed somewhere off the screens of the devices being used to video conference. As such, participants in traditional video conferences may not experience mutual eye contact while video conferencing. Thus, the trust and intimacy that eye contact affords is disrupted, leaving participants of traditional video conferences with an experience that is never truly satisfying. Responding to this disruption, the instant application identifies a need for improved systems and methods for establishing realistic eye contact during video conferences.

SUMMARY

As will be described in greater detail below, the instant disclosure describes various systems and methods for facilitating eye contact during video conferences by creating video streams from the perspective of imaginary cameras. In one example, a computer-implemented method for facilitating eye contact during video conferences may include detecting a video conference between a user of a computing device and a remote user of a remote computing device, identifying a location on the computing device's screen where the eyes of the remote user are displayed as part of the video conference, and creating a video stream of the user that appears to be taken from the perspective of an imaginary camera located at the eyes of the remote user.

In some examples, creating the video stream may include obtaining, from a camera coupled to the computing device, a video stream of the user participating in the video conference. In these examples, the obtained video stream may display video images of the user from the perspective of the camera coupled to the computing device. In one embodiment, creating the video stream may further include, after obtaining the video stream, manipulating the obtained video stream such that video images in the manipulated video stream appear to be taken from the perspective of the imaginary camera and not from the perspective of the camera coupled to the computing device.

After manipulating the obtained video stream, the disclosed method may also include transmitting the manipulated video stream of the user to the remote computing device of the remote user. In one embodiment, transmitting the manipulated video stream of the user may include transmitting the manipulated video stream in real time.

In some examples, obtaining the video stream from the camera may include (1) determining, in a first set of images in the video stream, that the user is looking at the location on the computing device's screen where the eyes of the remote user are displayed, and (2) determining, in a second set of images in the video stream, that the user is looking at an additional location away from the location on the computing device's screen where the eyes of the remote user are displayed. In these examples, manipulating the obtained video stream may include (1) manipulating the first set of images in the video stream such that the eyes of the user, as depicted in the manipulated first set of images in the video stream, appear to be gazing at the eyes of the remote user and (2) manipulating the second set of images in the video stream such that the eyes of the user, as depicted in the manipulated second set of images in the video stream, appear to be gazing at the additional location.

In one embodiment, the disclosed method may further include identifying a distance between (1) the location on the computing device's screen where the eyes of the remote user are displayed and (2) the additional location. In this embodiment, the method may also include creating, in the second set of images in the video stream, an angle offset for the gaze of the user that reflects the identified distance. In some examples, creating the angle offset for the gaze of the user may include basing the angle offset on (1) the size of the computing device's screen, (2) the size of a window including the display of the remote user's eyes, (3) the distance between the user and the computing device, and/or (4) the distance between the window and the additional location.

In one embodiment, the disclosed method may further include determining that the location on the computing device's screen where the eyes of the remote user are displayed has moved to a new location on the computing device's screen and changing a locality of the imaginary camera to correspond to the new location. This move to a new location may result from a change in a location of a window including the display of the remote user's eyes and/or a change in a location of the remote user's eyes within the window.

In one embodiment, obtaining the video stream of the user may include obtaining a three-dimensional video stream of the user. In this embodiment, manipulating the obtained video stream may include (1) rotating video images within the three-dimensional video stream such that the rotated video images appear to be taken from the perspective of the imaginary camera and (2) flattening the rotated images within the three-dimensional video stream to create two-dimensional images that appears to be taken from the perspective of the imaginary camera. In some examples, obtaining the three-dimensional video stream may include (1) obtaining a group of two-dimensional video streams, with each two-dimensional video stream originating from one of a group of cameras coupled to the computing device, and (2) creating the three-dimensional video stream based on the video streams.

In one embodiment, a system for implementing the above-described method may include (1) a detection module, stored in memory, that detects a video conference between a user of a computing device and a remote user of a remote computing device, (2) an identification module, stored in memory, that identifies a location on the computing device's screen where the eyes of the remote user are displayed as part of the video conference, (3) a creation module, stored in memory, that creates a video stream of the user that appears to be taken from the perspective of an imaginary camera located at the eyes of the remote user by (i) obtaining, from at least one camera coupled to the computing device, a video stream of the user participating in the video conference, with the obtained video stream displaying video images of the user from the perspective of the camera coupled to the computing device, and (ii) manipulating the obtained video stream such that video images in the manipulated video stream appear to be taken from the perspective of the imaginary camera and not from the perspective of the camera coupled to the computing device, (4) a transmission module, stored in memory, that transmits the manipulated video stream of the user to the remote computing device of the remote user, and (5) at least one physical processor configured to execute the detection module, the identification module, the creation module, and the transmission module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect a video conference between a user of the computing device and a remote user of a remote computing device, (2) identify a location on the computing device's screen where the eyes of the remote user are displayed as part of the video conference, (3) create a video stream of the user that appears to be taken from the perspective of an imaginary camera located at the eyes of the remote user by (i) obtaining, from at least one camera coupled to the computing device, a video stream of the user participating in the video conference, with the obtained video stream displaying video images of the user from the perspective of the camera coupled to the computing device, and (ii) manipulating the obtained video stream such that video images in the manipulated video stream appear to be taken from the perspective of the imaginary camera and not from the perspective of the camera coupled to the computing device, and (4) transmit the manipulated video stream of the user to the remote computing device of the remote user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
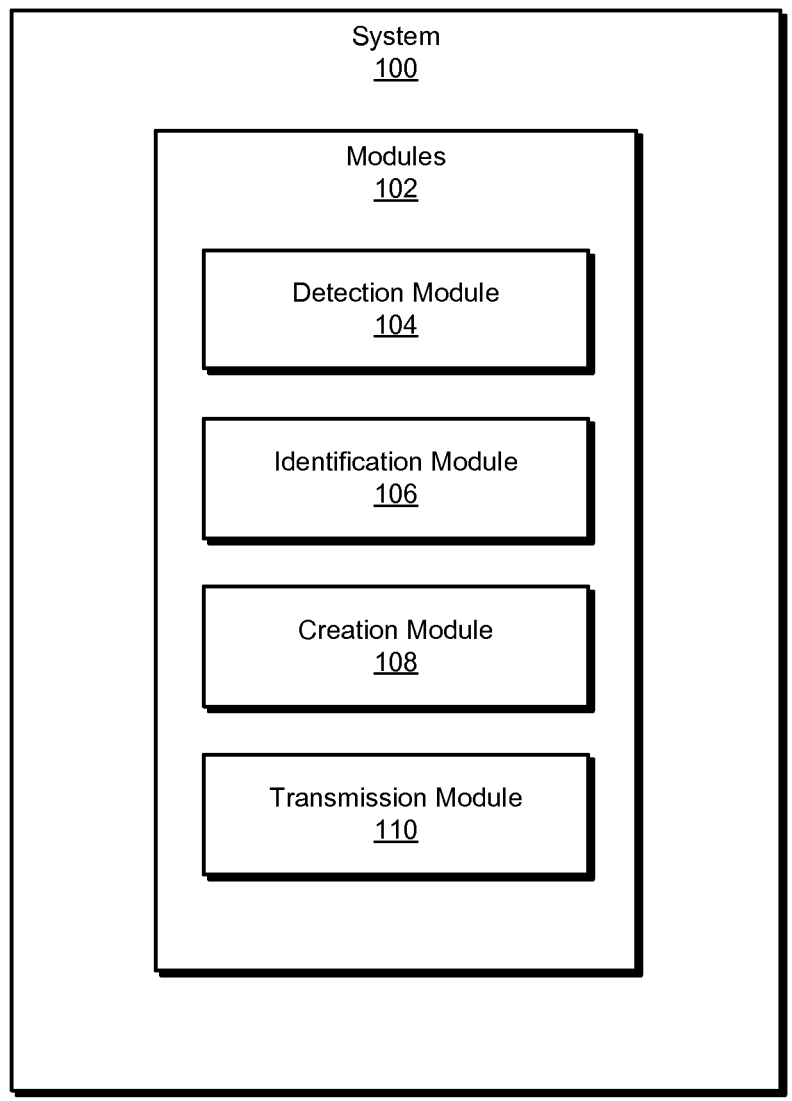
FIG. 1 is a block diagram of an exemplary system for facilitating eye contact during video conferences.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for facilitating eye contact between participants of a video conference. As will be explained in greater detail below, the disclosed systems and methods may facilitate creating a video stream of a user that accurately portrays both the user's eye contact and the user's intermittent breaks in eye contact during a video conference by adjusting the video stream based on (1) a location on the user's computer screen where the eyes of another user are displayed, and (2) a location at which the user is gazing.

The following will provide, with reference to FIGS. 1-2 and 4-5, detailed descriptions of exemplary systems for facilitating eye contact during video conferences. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for facilitating eye contact during video conferences. As illustrated in this figure, exemplary system 100 may include one or more modules 102 for performing one or more tasks. For example, and as will be explained in greater detail below, exemplary system 100 may include a detection module 104 that detects a video conference between a user of the computing device and a remote user of a remote computing device. Exemplary system 100 may additionally include an identification module 106 that identifies a location on the computing device's screen where the eyes of the remote user are displayed as part of the video conference.

Exemplary system 100 may also include a creation module 108 that creates a video stream of the user that appears to be taken from the perspective of an imaginary camera located at the eyes of the remote user. In some examples, creation module 108 may create the video stream by (1) obtaining, from a camera coupled to the computing device, a video stream of the user participating in the video conference, and (2) manipulating the obtained video stream such that video images in the manipulated video stream appear to be taken from the perspective of the imaginary camera. Exemplary system 100 may additionally include a transmission module 110 that transmits the manipulated video stream of the user to the remote computing device of the remote user. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or remote computing device 206), computing system 610 in FIG. 6, and/or portions of exemplary network architecture 700 in FIG. 7). In some embodiments, one or more of modules 102 may operate as part of an application that enables video conferences (e.g., a video conference application running on computing device 202 and/or remote computing device 206). Additionally or alternatively, one or more of modules 102 may operate as part of a third-party application (e.g., a third-party application running on computing device 202 and/or remote computing device 206) that is configured to integrate with the video conference application.

In one example, one or more of modules 102 may be configured to run on a remote server (e.g., a server that is remote from computing device 202 and/or remote computing device 206). For example, one or more of modules 102 may be configured to run on a server managed by a video conferencing service. One or more of modules 102 in FIG. 1 may also represent all or portions of one or more special-purpose computers configured to perform one or more tasks.

Figure 2:
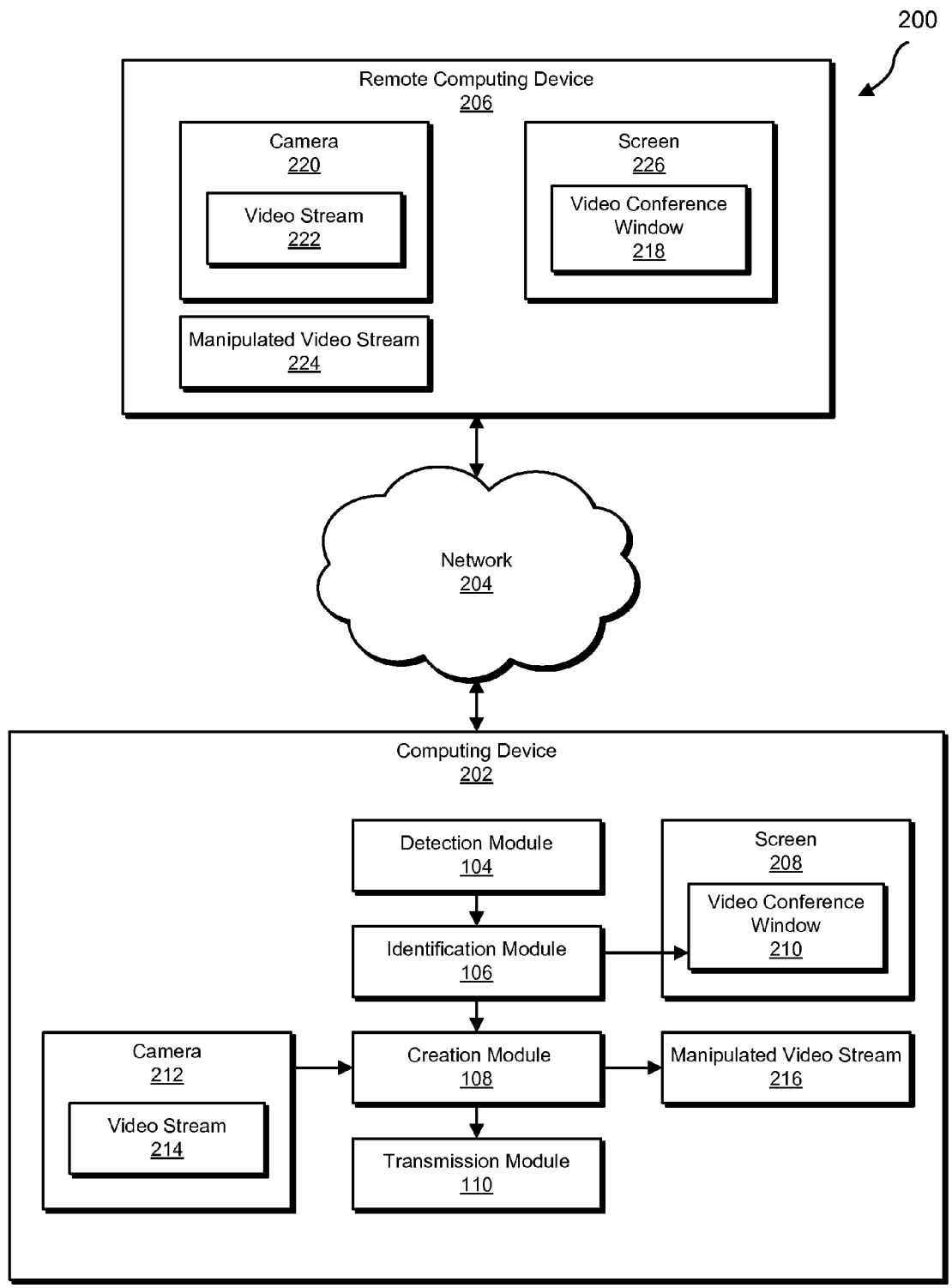
FIG. 2 is a block diagram of an additional exemplary system for facilitating eye contact during video conferences.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a remote computing device 206 via a network 204. In one example, computing device 202 may be programmed with one or more of modules 102. Additionally or alternatively, remote computing device 206 may be programmed with one or more of modules 102. In one embodiment, one or more of modules 102 from FIG. 1 may, when executed by at least one processor of computing device 202 and/or remote computing device 206, enable computing device 202 and/or remote computing device 206 to facilitate eye contact during video conferences.

For example, and as will be described in greater detail below, detection module 104 may detect a video conference between a user of computing device 202 and a remote user of remote computing device 206. In this example, identification module 106 may identify a location on a screen 208 of computing device 202 where the eyes of the remote user are displayed as part of a video conference displayed in a video conference window 210. Creation module 108 may then create a manipulated video stream 216 of the user that appears to be taken from the perspective of an imaginary camera located at the eyes of the remote user by (1) obtaining, from a camera 212 coupled to computing device 202, a video stream 214 of the user participating in the video conference and (2) manipulating video stream 214 such that video images in manipulated video stream 216 appear to be taken from the perspective of the imaginary camera and not from the perspective of camera 212. Transmission module 110 may then transmit manipulated video stream 216 to remote computing device 206.

Computing device 202 and/or remote computing device 206 generally represent any type or form of computing device capable of reading computer-executable instructions. Examples of computing device 202 and/or remote computing device 206 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

In some embodiments, computing device 202 and/or remote computing device 206 may represent computing devices that are capable of enabling video conferencing. For example, computing device 202 and/or remote computing device 206 may represent a computing device (e.g., a computing device coupled to a camera and microphone) that is capable of generating, transmitting, and/or receiving video streams for a video conference.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and remote computing device 206. For example, network 204 may facilitate transmitting video streams for video conferences between computing device 202 and remote computing device 206.

Camera 212 and/or camera 220 generally represent any type or form of device capable of acquiring and/or processing electronic motion pictures. In some examples, camera 212 and/or camera 220 may represent a webcam that feeds motion pictures to a computing device (such as computing device 202 and/or remote computing device 206) in real time. In some embodiments, camera 212 may connect to computing device 202 (and/or camera 220 may connect to remote computing device 206) via a cable, such as a Universal Serial Bus (USB) cable. Additionally or alternatively, camera 212 may be built into the hardware of computing device 202 (and/or camera 220 may be built into the hardware of remote computing device 206).

Screen 208 and/or screen 226 generally represent any type or form of computer monitor that provides an electronic visual display for computing device 202 and/or remote computing device 206. In some examples, screen 208 and/or screen 226 may display graphical user interfaces for a video conference (such as video conference window 210 and/or video conference window 218).

Figure 3:
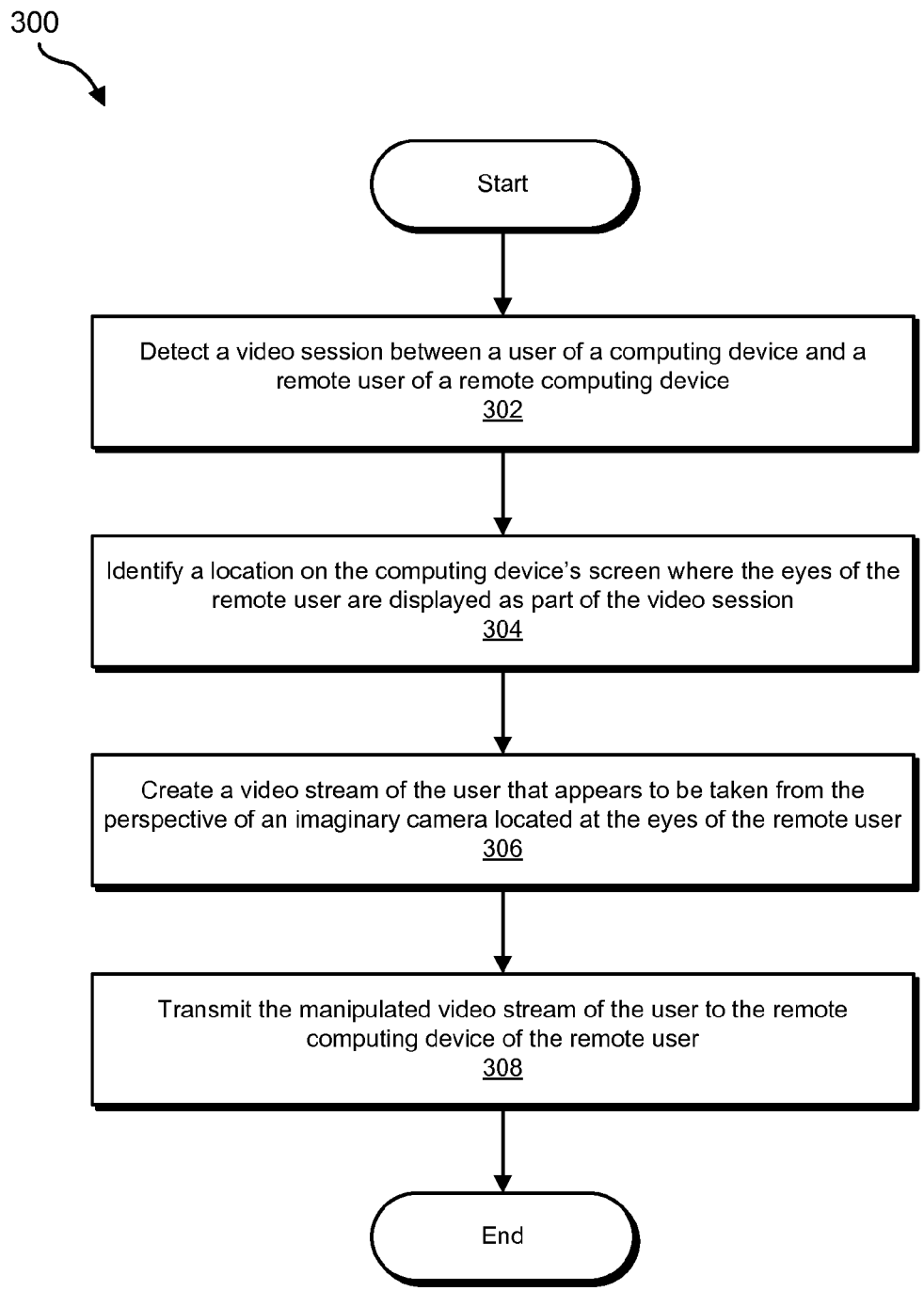
FIG. 3 is a flow diagram of an exemplary method for facilitating eye contact during video conferences.

FIG. 3 is a flow diagram of an exemplary computer-implemented method 300 for facilitating eye contact during video conferences. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may detect a video conference between a user of a computing device and a remote user of a remote computing device. For example, detection module 104 may, as part of computing device 202 in FIG. 2, detect a video conference between a user of computing device 202 and a remote user of remote computing device 206. In this example, the visual elements of the video conference may be displayed on screen 208 of computing device 202 via video conference window 210 and also on screen 226 of remote computing device 206 via video conference window 218.

As used herein, the term "video conference" generally refers to any type or form of digital communication between two or more users (e.g., users in two or more remote locations). In some examples, a video conference may include video and audio transmission. For example, a computing device of a user participating in a video conference may, as part of the video conference, transmit a video stream of the user to another computing device of another user participating in the video conference and/or to a server mediating the video conference. In some embodiments, two or more computing devices may each simultaneously send video streams of users participating in a video conference. Using FIG. 2 as a specific example, computing device 202 may transmit video stream 214 (and/or manipulated video stream 216) of a user of computing device 202 to remote computing device 206. At the same time, remote computing device 206 may transmit a video stream 222 (and/or a manipulated video stream 224) of a user of remote computing device 206 to computing device 202.

As used herein, the term "video stream" generally refers to any type or form of multimedia content being transmitted between devices involved in a video conference. In some examples, the multimedia content may be transmitted in real time. For example, a video stream depicting a user of computing device 202 (e.g., video stream 214 and/or manipulated video stream 216) may be continually delivered to remote computing device 206 as the video stream is being created. In this example, remote computing device 206 may continually receive the video stream and continually present the video stream to a user of remote computing device 206 as the video stream is being delivered. In some examples, the video stream may be delivered by computing device 202. In other examples, the video stream may be delivered by a remote server of a video conference provider.

As used herein, the term "video conference window" generally refers to any type or form of graphical control element with a visual area that displays visual elements of a video conference. In some examples, the visual area may display a video stream. For example, the visual area of video conference window 210 may display video stream 222 and/or manipulated video stream 224 that depict a user of remote computing device 206 participating in a video conference. Similarly, the visual area of video conference window 218 may display video stream 214 and/or manipulated video stream 216 that depict a user of computing device 202 participating in the video conference.

Detection module 104 may detect the video conference in response to a variety of events. In some examples, detection module 104 may detect the video conference in response to detecting that one or more of the video conference's participants initiated the video conference. For example, detection module 104 may determine that a user of computing device 202 submitted input to computing device 202 to open video conference window 210 and/or to log in to a video conference.

Additionally or alternatively, detection module 104 may detect the video conference in response to detecting that one or more of the video conference's participants would like to enable an eye-contact feature for the video conference. For example, detection module 104 may determine that a user of computing device 202 submitted input to computing device 202 (e.g., via video conference window 210) to enable a feature that creates the illusion of eye contact between the video conference's participants.

At step 304, one or more of the systems described herein may identify a location on the computing device's screen where the eyes of the remote user are displayed as part of the video conference. For example, identification module 106 may, as part of computing device 202 in FIG. 2, identify a location on screen 208 (e.g., a location within video conference window 210) where the eyes of the remote user are displayed.

Identification module 106 may identify the location of the remote user's eyes in a variety of ways. In some examples, identification module 106 may utilize object class detection techniques to identify the remote user's eyes. For example, identification module 106 may use a face detection algorithm to parse the images displayed by screen 208 in order to detect shapes corresponding to human eyes. Additionally or alternatively, identification module 106 may identify the eyes based on the eyes' relative position to other facial shapes (e.g., a nose shape, an eyebrow shape, a forehead shape, etc.). In some embodiments, identification module 106 may parse images displayed anywhere on screen 208. In other embodiments, identification module 106 may only parse images displayed within a portion of screen 208 corresponding to video conference window 210.

In addition to identifying the shapes corresponding to human eyes, identification module 106 may also determine the location of the shapes corresponding to the human eyes. Using FIG. 4 as a specific examples, identification module 106 may determine that, at time 11:23:02, there is one pair of human eyes displayed in video conference window 210 on screen 208. Identification module 106 may also determine that the eyes, at time 11:23:02, are located at the pixel coordinates (8, 10) and (10, 10) of screen 208.

Figure 4:
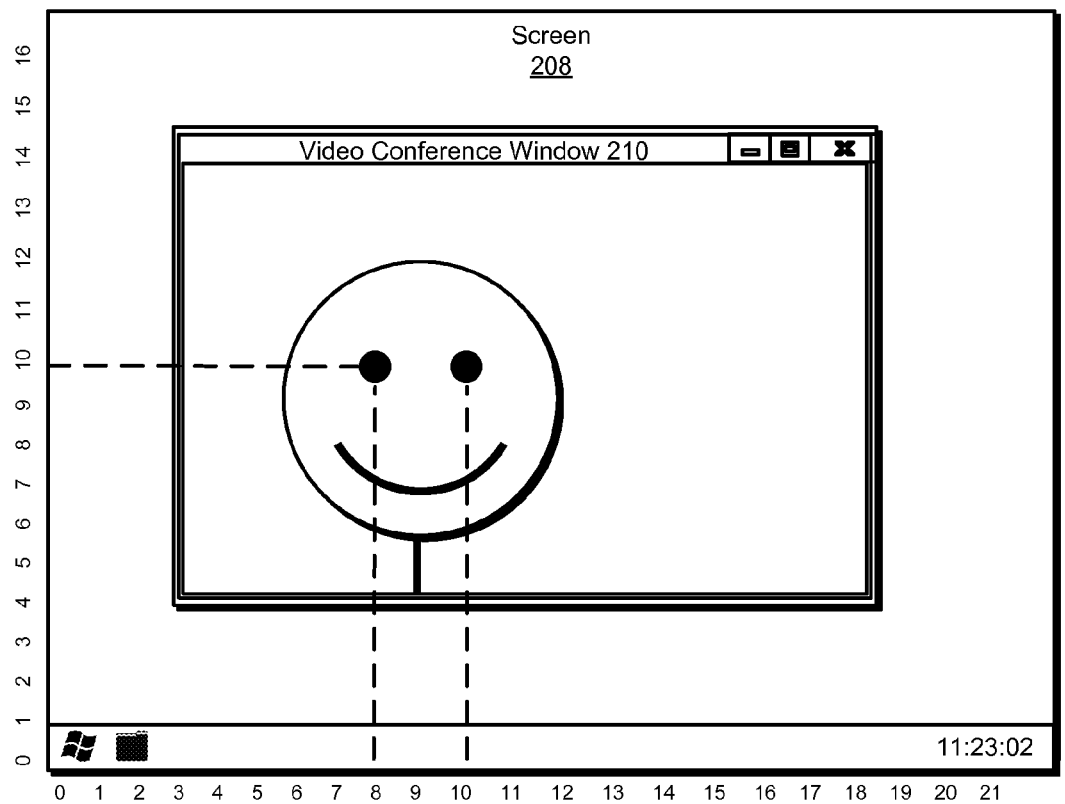
FIG. 4 is a block diagram of an exemplary screen of a computing device used during a video conference at various moments in time.
Figure 4:
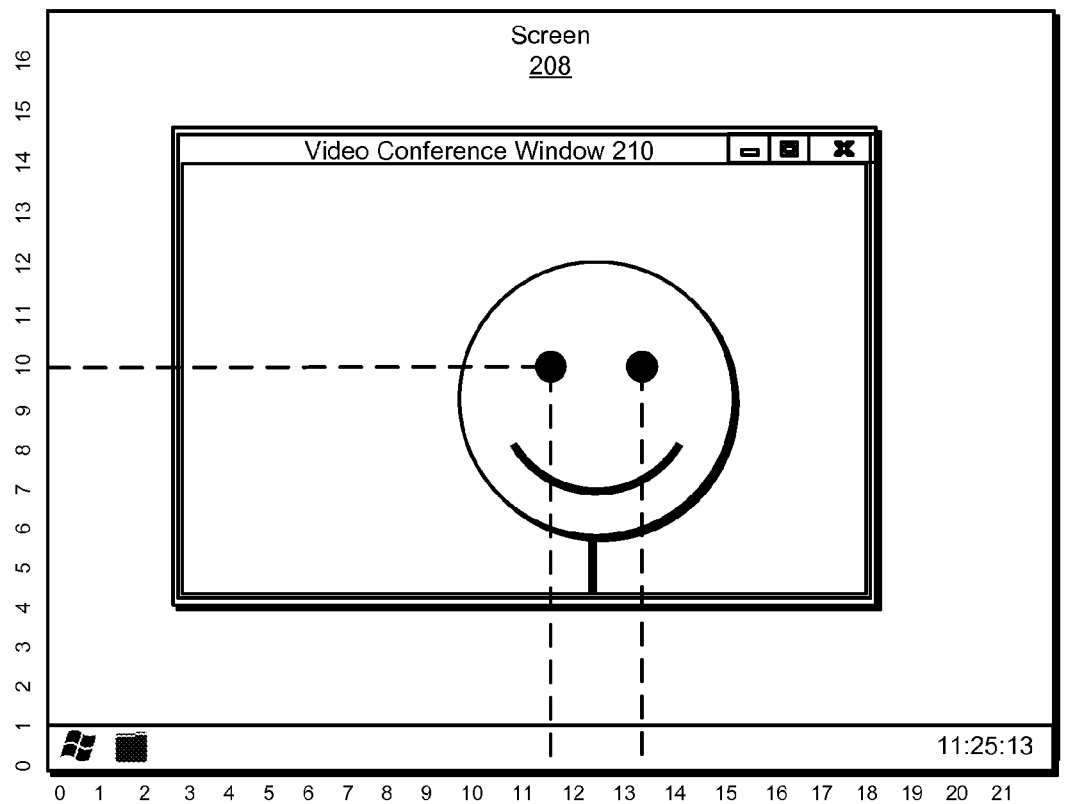
Figure 5:
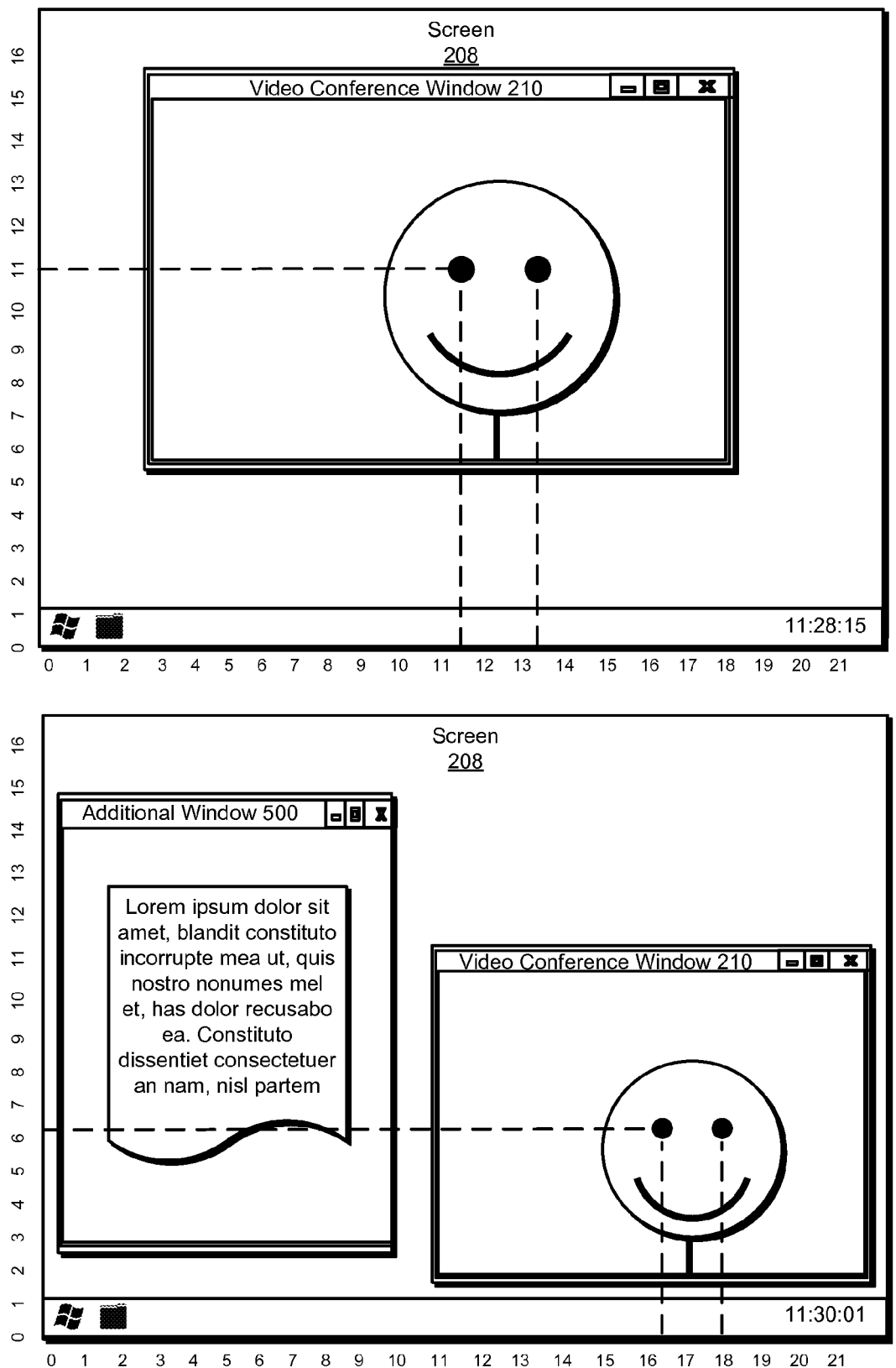
FIG. 5 is an additional block diagram of the exemplary screen of the computing device used during the video conference at additional moments in time.

As used herein, the term "pixel coordinates" generally refers to a group of numbers used to indicate a position within a digital image. For example, "pixel coordinates" may refer to a set of 2 coordinates (e.g., a coordinate corresponding to an X position within a digital image and a coordinate corresponding to Y position within the digital image). The numbers associated with the pixel coordinates used herein with reference with FIGS. 4 and 5 are intended to be viewed as relative.

In some embodiments, identification module 106 may determine that the location on screen 208 where the eyes of the remote user were previously displayed has moved to a new location on screen 208. This move may result from various events. In one example, the change in location may result from a change in a location of the remote user's eyes within video conference window 210. For example, the change may result from the remote user moving at his or her remote location. Using FIG. 4 as a specific example, identification module 106 may determine that, at time 11:25:13, the remote user shifted at his or her remote location, resulting in a 3.2 cm shift in the image of the remote user displayed in video conference window 210 relative to the remote user's location at time 11:23:02. As a result, the eyes of the remote user on screen 208 may have moved to be located at the pixel coordinates (11.5, 10) and (13.5, 10).

In an additional or alternative example, the change in location may result from a change in a location of video conference window 210 within screen 208. Using FIG. 5 as a specific example, identification module 106 may determine that, at time 11:28:15, the location of video conference window 210 within screen 208 has moved (e.g., as a result of input to computing device 202 from the user) relative to the location of video conference window 210 within screen 208 at time 11:12:02. As a result, the eyes of the remote user on screen 208 may have moved to be located at the pixel coordinates (11.5, 11) and (13.2, 11).

In an additional or alternative example, the change in location may result from a change in the size of video conference window 210 within screen 208. Using FIG. 5 as a specific example, identification module 106 may determine that, at time 11:30:01, video conference window 210 has been reduced in size and moved relative to the size and position of video conference window 210 at time 11:28:15. As a result, the eyes of the remote user on screen 208 may have moved to be located at the pixel coordinates (16.2, 6.2) and (18, 6.2).

Returning to FIG. 3, at step 306, one or more of the systems described herein may create a video stream of a user that appears to be taken from the perspective of an imaginary camera. For example, creation module 108 may, as part of computing device 202 in FIG. 2, create manipulated video stream 216 by (1) obtaining video stream 214 from camera 212 coupled to computing device 202 and (2) manipulating video stream 214 to create manipulated video stream 216. Each of these steps will be discussed, in turn.

First, creation module 108 may obtain video stream 214, which depicts a user of computing device 202 participating in a video conference, from camera 212 coupled to computing device 202. Creation module 108 may obtain video stream 214 in a variety of ways. In some examples, creation module 108 may obtain video stream 214 by accessing camera 212 directly (e.g., via an Application Programming Interface of camera 212). In other examples, creation module 108 may obtain video stream 214 from an application that facilitates the video conference (e.g., an application supported by a video conference service such as SKYPE, FACETIME, or a CISCO conferencing service).

In some embodiments, creation module 108 may obtain a three-dimensional video stream. For example, camera 212 may represent one of multiple cameras coupled to computing device 202. To give a specific example, computing device 202 may be coupled to three cameras: one located along the top border of the screen in the middle of the border, one located in the bottom left corner of the screen, and one located in the bottom right corner of the screen. In these embodiments, creation module 108 may obtain a two-dimensional video stream from each of the multiple cameras. Then, creation module 108 may combine each of the two-dimensional video streams to create a three-dimensional video stream. In additional or alternative examples, camera 212 may represent a single camera capable of capturing three-dimensional video streams (e.g., such as a MINORU 3D WEBCAM and/or a PLAYSTATION 4 CAMERA). In these examples, creation module 108 may obtain a three-dimensional video stream simply by obtaining a single three-dimensional video stream from camera 212.

Next, after obtaining video stream 214, creation module 108 may manipulate video stream 214 to create manipulated video stream 216. In some examples, creation module 108 may manipulate video stream 214 by (1) identifying a location for an imaginary camera and (2) manipulating video stream 214 such that the manipulated version of video stream 214 (i.e., manipulated video stream 216) appears to be taken from the perspective of the imaginary camera and not from the perspective of camera 212.

As used herein, the term "imaginary camera" refers to a camera that does not physically exist. Manipulating a video stream such that it appears to be taken from the perspective of an imaginary camera may be desirable in instances where the desired camera placement may be infeasible. For example, the ideal placement for a camera used in video conferencing may be on a screen at a location where the remote user's eyes are displayed. This way, when a user looks at the location of the remote user's eyes, he will be looking into the camera, which may facilitate eye contact. However, placing a camera at the location of the remote user's eyes is problematic for a number of reasons. For example, the location of the remote user's eyes may not be static. Additionally, placing a camera on the surface of a screen may be technologically infeasible and/or prohibitively expensive on the devices most commonly used for video conferencing.

Creation module 108 may identify the location for the imaginary camera in a variety of ways. In one embodiment, creation module 108 may place the imaginary camera at the location on screen 208 where the eyes of the remote user are currently displayed. Using FIG. 4 as a specific example, creation module 108 may determine that, at time 11:23:02, the eyes of the remote user are located at the pixel coordinates (8, 10) and (10, 10) of screen 208. Thus, in this example, creation module 108 may place the imaginary camera on screen 208 between the pixel coordinates (8, 10) and (10, 10). In this embodiment, the imaginary camera placement may be dynamic. For example, if the location where the display of the remote user's eyes moves (e.g., if video conference window 210 moves and/or changes in size and/or if the location of the remote user within video conference window 210 moves), the locality of the imaginary camera may also move such that the imaginary camera is continually placed at the location on screen 208 where the eyes of the remote user are displayed.

In another embodiment, creation module 108 may place the imaginary camera in a predefined segment of video conference window 210. For example, creation module 108 may place the imaginary camera in the center of video conference window 210. Using FIG. 5 as a specific example, creation module 108 may determine that, at time 11:30:01, the center of video conference window 210 is located at the pixel coordinates (17, 6.2). Thus, in this example, creation module 108 may, at 11:30:01, place the imaginary camera on screen 208 at the pixel coordinates (17, 6.2). In this embodiment, the placement of the imaginary camera may move if the location of video conference window 210 on screen 208 moves and/or changes in size, but the placement of the imaginary camera may not move if the image of the remote user moves within video conference window 210.

In another embodiment, creation module 108 may place the imaginary camera at a static location on screen 208. For example, creation module 108 may place the imaginary camera in the center of screen 208. In one example of this embodiment, the static placement of the imaginary camera may not move. In another example of this embodiment, the static location may be set based on input from a user (e.g., input such as a mouse click that selects a placement for the imaginary camera). In this example, the static location may change based on additional input from the user to change the placement of the imaginary camera.

After identifying a placement for the imaginary camera, creation module 108 may manipulate video stream 214 such that manipulated video stream 216 appears to be taken from the perspective of the imaginary camera. For example, in embodiments where creation module 108 obtained a three-dimensional video stream, creation module 108 may rotate the images within the three-dimensional video stream such that the rotated video images appear to be taken from the perspective of the imaginary camera. Then, creation module 108 may flatten the rotated images to create two-dimensional images that appear to be taken from the perspective of the imaginary camera instead of appearing to be captured by camera 212, the perspective from which the first set of images were actually captured.

In addition to identifying a location on screen 208 where the remote user's eyes are located, and manipulating video stream 214 based on this identification, creation module 108 may also identify the user's point of gaze. Creation module 108 may identify the user's point of gaze in a variety of ways. In some examples, creation module 108 may use optical eye tracking techniques to track the movement of the user's eyes. For example, creation module 108 may rely on a device embedded in and/or coupled to computing device 202 to transmit a light source (such as an infrared beam) at the eyes of the user. In these examples, creation module 108 may rely on a sensor (e.g., a sensor embedded in and/or coupled to computing device 202 such as camera 212) to identify a reflection of the light source from the eyes. Then, creation module 108 (and/or software relied on by computing device 202) may analyze the reflection to determine the direction of the user's gaze. In one example, creation module 108 may identify, based on the reflection, the pixel coordinates on screen 208 at which the user is gazing.

In some examples, creation module 108 may determine that, in a first set of images within video stream 214, the user is looking at the location on screen 208 where the eyes of the remote user are displayed. Using FIG. 4 as a specific example, creation module 108 may determine that, at time 11:23:02, the user is gazing between the pixel coordinates (8, 10) and (10, 10) of screen 208 (i.e., the location where the remote user's eyes are displayed). In these examples, creation module 108 may create an illusion of eye contact by adjusting the first set of images in video stream 214 such that the corresponding images in manipulated video stream 216 appear to have been taken from the perspective of an imaginary camera located at the location on screen 208 where the remote user's eyes are displayed (i.e., between the pixel coordinates (8, 10) and (10, 10)), as discussed above.

In additional examples, creation module 108 may also determine that, in a second set of images within video stream 214, the user is looking at an additional location that is away from the location where the remote user's eyes are displayed. Using FIG. 5 as a specific example, creation module 108 may determine that, at time 11:30:01, the user is gazing at pixel coordinates corresponding to an additional window 500 docked to the side of video conference window 210 (e.g., at the pixel coordinates (3.2, 9.8)) and not gazing at the display of the remote user's eyes.

In these examples, creation module 108 may, as was done for the first set of images, manipulate the second set of images in video stream 214 such that the corresponding images in manipulated video stream 216 appear to have been taken from the perspective of an imaginary camera located at the location on screen 208 where the remote user's eyes are displayed (i.e., between the pixel coordinates (16.2, 6.2) and (18, 6.2)). Additionally, creation module 108 may adjust the appearance of the user's gaze in the corresponding images of manipulated video stream 216, such that the user appears to be gazing at the additional location (e.g., at the pixel coordinates (3.2, 9.8)) and not at the location where the remote user's eyes are displayed.

Creation module 108 may adjust the appearance of the user's gaze in a variety of ways. In some examples, creation module 108 may identify a distance between the display of the remote user's eyes and the user's point of gaze. Returning to FIG. 5 as a specific example, creation module 108 may determine that, at time 11:30:01, the distance between the display of the remote user's eyes and the user's point of gaze is a distance of (−12.7, 3.3). In another specific example, creation module 108 may determine that the user is gazing at a location outside the perimeters of screen 208. In this example, creation module 108 may identify a distance between the display of the remote user's eyes and the location outside the perimeters of screen 208. In one embodiment, creation module 108 may calculate this distance based on the rotation of the user's eyes. In some examples, creation module 108 may, in addition to calculating a magnitude of the distance between the display of the remote user's eyes and the user's point of gaze, also calculate a direction of the distance (e.g., up, down, left, right, etc.).

After identifying a distance between the display of the remote user's eyes and the user's point of gaze, creation module 108 may create an angle offset for the user's gaze in manipulated video stream 216 that is based on the identified distance. In some embodiments, creation module 108 may further based the angle offset on a variety of additional factors. For example, creation module 108 may base the angle offset on (1) a size of screen 208 and/or screen 226, (2) a size of video conference window 210 and/or video conference window 218, (3) a distance between the user and computing device 202 and/or between the remote user and remote computing device 206, (4) an angle of the user relative to computing device 202 and/or of the remote user relative to remote computing device 206, (5) a distance between video conference window 210 and the user's point of gaze, and/or (6) a distance between video conference window 218 and the remote user's point of gaze.

By adjusting the user's gaze for segments of manipulated video stream 216 in which the user is looking away from the remote user's eyes, the disclosed systems and methods may simulate the natural break in eye contact that occurs in natural non-digital conversation. Also, by creating an angle offset for user's gaze based on the factors discussed above, the disclosed systems and method may create a video conference in which the remote user is able to deduce, based on the gaze displayed in manipulated video stream 216, where the user is gazing when the user breaks eye contact. For example, if the user is gazing at a location of video conference window 210 displaying a book that the remote user is holding, the remote user may be able to identify, based on the appearance of the user's gaze in manipulated video stream 216, that the user is gazing at the book.

In some embodiments, an additional instance of creation module 108 may operate as part of an application running on remote computing device 206. In these embodiments, the additional instance of creation module 108 may obtain video stream 222 captured by camera 220 in essentially the same way that creation module 108 obtains video stream 214. Also, the additional instance of creation module 108 may manipulate video stream 222 to create manipulated video stream 224 in essentially the same way that creation module 108 creates manipulated video stream 216. In additional or alternative embodiments, creation module 108 may operate as part of a server that provides video conferencing services for computing device 202 and/or remote computing device 206. In such embodiments, creation module 108 may provide the functionality described above on behalf of remote computing device 206 in addition to providing the functionality for computing device 202.

Returning to FIG. 3, at step 308, one or more of the systems described herein may transmit the manipulated video stream of the user to the remote computing device of the remote user. For example, transmission module 110 may, as part of computing device 202 in FIG. 2, transmit manipulated video stream 216 to remote computing device 206.

Transmission module 110 may transmit manipulated video stream 216 in a variety of ways. In some embodiments, transmission module 110 may operate as part of a video conference application running on computing device 202. In these embodiments, transmission module 110 may transmit manipulated video stream 216 from computing device 202 to remote computing device 206 (e.g., so that an instance of the video conference application running on remote computing device 206 may stream manipulated video stream 216 in video conference window 218). In additional or alternative embodiments, transmission module 110 may operate as part of a server of a third-party video conferencing service. In these embodiments, transmission module 110 may transmit manipulated video stream 216 from the server to remote computing device 206.

In some examples, transmission module 110 may transmit manipulated video stream 216 in real time. In these examples, transmission module 110 may also simultaneously receive a video stream (such as video stream 222 and/or manipulated video stream 224) from remote computing device 206 (e.g., so that the video conference application running on computing device 202 may stream the video stream received from remote computing device 206 in video conference window 210).

As discussed above, the disclosed systems and methods may facilitate creating video conferences that mimic natural conversation. In natural conversation, people cycle between making and breaking eye contact. The disclosed systems and methods may facilitate creating video conferences that mimic these cycles using a combination of (1) window tracking (2) and eye tracking.

In one embodiment, the disclosed systems and methods may place an imaginary camera at a location of a participant's computer screen where the eyes another participant are displayed. In this embodiment, the disclosed systems and methods may manipulate a video conference stream depicting the participant such that the manipulated stream appears to have been taken from the perspective of the imaginary camera. In some examples, the placement of the imaginary camera may be dynamic, allowing for the participant to maintain eye contact with the other participant even if (1) the participant moves a window displaying the other participant and/or (2) the other participant physically moves (affecting his/her placement within the window).

In some embodiments, the participant may look away from the other participant's eyes during the course of the video conference. In these embodiments, the disclosed systems and methods may identify a distance between the participant's point of gaze and the location of his/her screen where the eyes of the other participant are displayed. In one example, the disclosed systems and methods may identify both a magnitude of the distance and a direction of the distance (e.g., up, down, left, right, etc.).

After identifying the distance, the disclosed systems and methods may further manipulate the stream by adjusting the gaze of the participant in the stream to reflect the identified distance. By creating a stream from the perspective of the imaginary camera and adjusting the participant's gaze in the stream, the disclosed systems and methods may (1) create an illusion of eye contact at moments in which the participant's point of gaze falls on the remote user's eyes, (2) create an illusion of a break in eye contact at moments in which the participant's point of gaze falls away from the remote user's eyes, and (3) create an offset for the user's gaze that accurately reflects the direction and magnitude of the user's gaze when the user is breaking eye contact.

Figure 6:
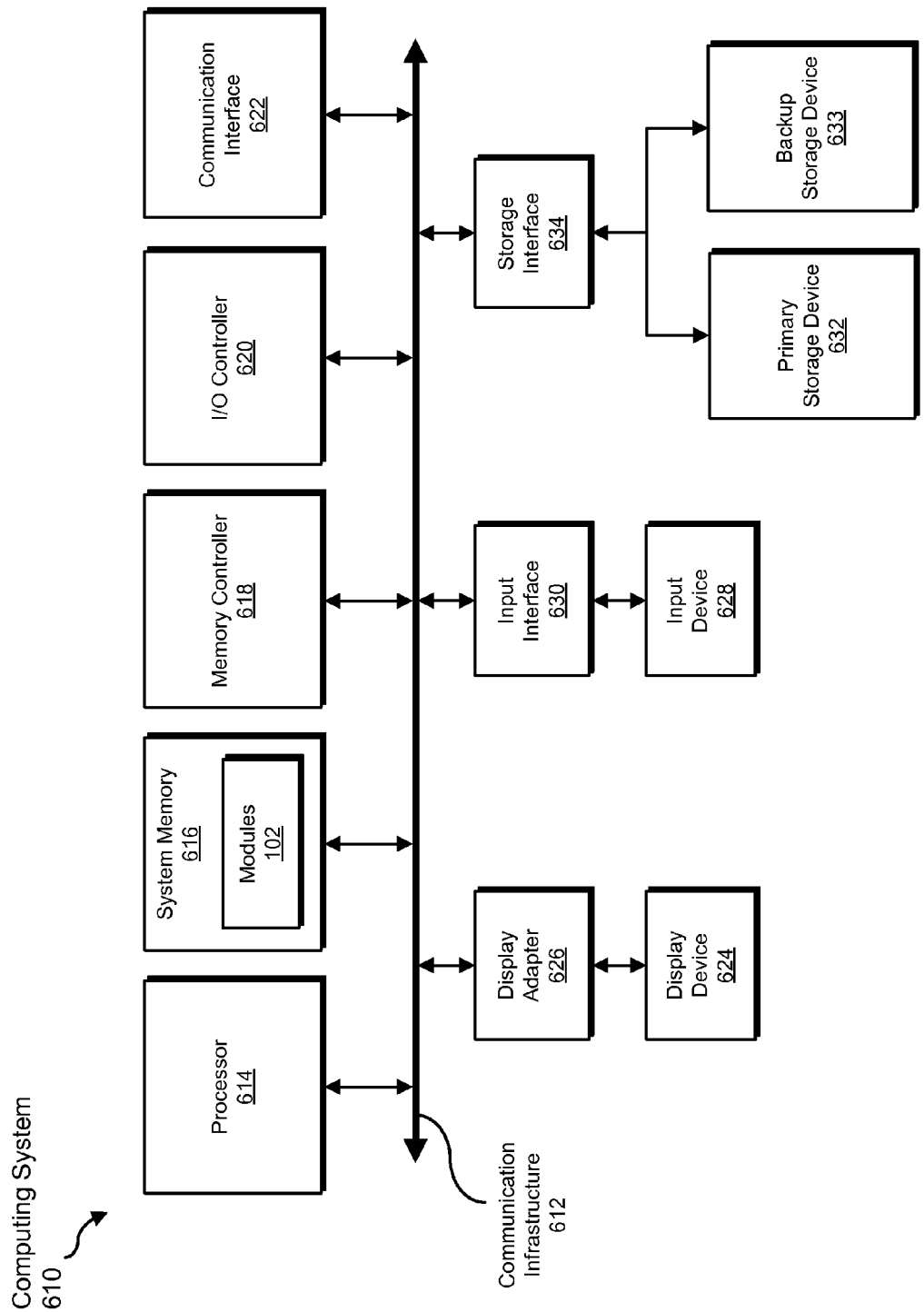
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
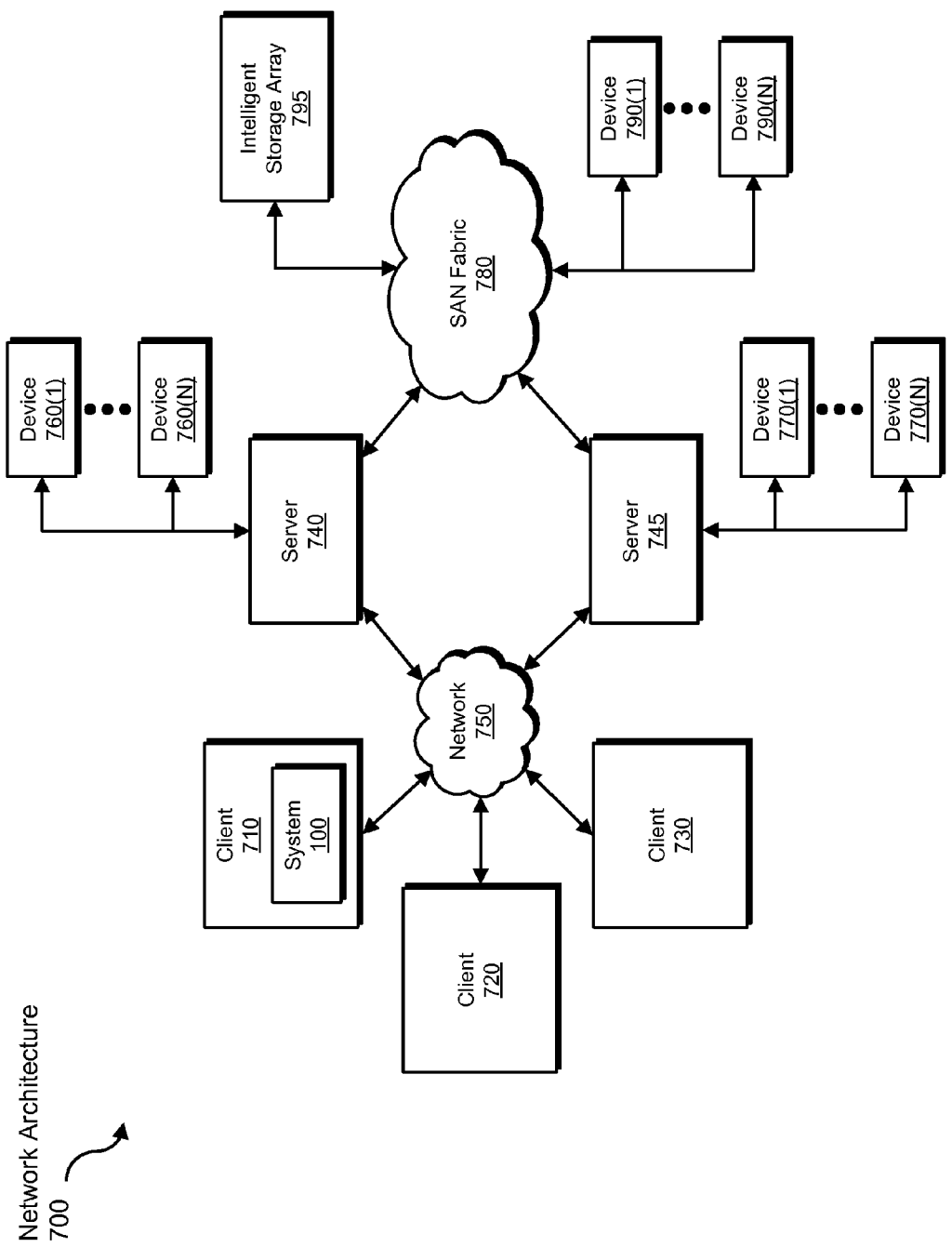
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for facilitating eye contact during video conferences.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all ora portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a video stream taken from the perspective of a physical camera and transform the video stream into a manipulated video stream taken from the perspective of an imaginary camera which is in a different location than the physical camera which captured the video stream. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for facilitating eye contact during video conferences, at least a portion of the method being performed by a computing device comprising at least one processor, the method comprising:
   detecting a video conference between a user of the computing device and a remote user of a remote computing device;
   identifying a location on the computing device's screen where the eyes of the remote user are displayed as part of the video conference;
   creating a video stream of the user that appears to be taken from the perspective of an imaginary camera located at the eyes of the remote user by:
      obtaining, from at least one camera coupled to the computing device, a video stream of the user participating in the video conference, the obtained video stream displaying video images of the user from the perspective of the camera coupled to the computing device;
      determining, in a first set of images in the video stream, that the user is looking at the location on the computing device's screen where the eyes of the remote user are displayed;
      determining, in a second set of images in the video stream, that the user is looking at an additional location away from the location on the computing device's screen where the eyes of the remote user are displayed;

manipulating the obtained video stream such that video images in the manipulated video stream appear to be taken from the perspective of the imaginary camera and not from the perspective of the camera coupled to the computing device by:

manipulating the first set of images in the video stream such that the eyes of the user, as depicted in the manipulated first set of images in the video stream, appear to be gazing at the eyes of the remote user;

manipulating the second set of images in the video stream such that the eyes of the user, as depicted in the manipulated second set of images in the video stream, appear to be gazing at the additional location; and transmitting the manipulated video stream of the user to the remote computing device of the remote user.

2. The computer-implemented method of claim 1, wherein transmitting the manipulated video stream to the remote computing device comprises transmitting the manipulated video stream in real time.

3. The computer-implemented method of claim 1, wherein:

determining that the user is gazing at the additional location comprises identifying a distance between the location on the computing device's screen where the eyes of the remote user are displayed and the additional location;

manipulating the second set of images in the video stream comprising creating, in the second set of images in the video stream, an angle offset for the gaze of the user that reflects the identified distance.

4. The computer-implemented method of claim 3, wherein identifying the distance between the location on the computing device's screen where the eyes of the remote user are displayed and the additional location comprises identifying at least one of:

a magnitude of the distance;

a direction of the distance.

5. The computer-implemented method of claim 3, wherein creating the angle offset for the gaze of the user comprises basing the angle offset on at least one of:

a size of the computing device's screen;

a size of a window comprising the display of the remote user's eyes;

a distance between the user and the computing device;

a distance between the window and the additional location.

6. The computer-implemented method of claim 1, further comprising:

determining that the location on the computing device's screen where the eyes of the remote user are displayed has moved to a new location on the computing device's screen;

changing a locality of the imaginary camera to correspond to the new location.

7. The computer-implemented method of claim 6, wherein the location has moved to the new location as a result of at least one of:

a change in a location of a window comprising the display of the remote user's eyes;

a change in a location of the remote user's eyes within the window.

8. The computer-implemented method of claim 1, wherein obtaining the video stream of the user comprises obtaining a three-dimensional video stream of the user.

9. The computer-implemented method of claim 8, wherein manipulating the obtained video stream comprises:

rotating video images within the three-dimensional video stream such that the rotated video images appear to be taken from the perspective of the imaginary camera;

flattening the rotated images within the three-dimensional video stream to create two-dimensional images that appears to be taken from the perspective of the imaginary camera.

10. The computer-implemented method of claim 8, wherein obtaining the video stream comprises:

obtaining a plurality of two-dimensional video streams, each two-dimensional video stream originating from one of a plurality of cameras coupled to the computing device;

creating the three-dimensional video stream based on the plurality of video streams.

11. A system for facilitating eye contact during video conferences, the system comprising:

a detection module, stored in memory, that detects a video conference between a user of a computing device and a remote user of a remote computing device;

an identification module, stored in memory, that identifies a location on the computing device's screen where the eyes of the remote user are displayed as part of the video conference;

a creation module, stored in memory, that creates a video stream of the user that appears to be taken from the perspective of an imaginary camera located at the eyes of the remote user by:

obtaining, from at least one camera coupled to the computing device, a video stream of the user participating in the video conference, the obtained video stream displaying video images of the user from the perspective of the camera coupled to the computing device;

determining, in a first set of images in the video stream, that the user is looking at the location on the computing device's screen where the eyes of the remote user are displayed;

determining, in a second set of images in the video stream, that the user is looking at an additional location away from the location on the computing device's screen where the eyes of the remote user are displayed;

manipulating the obtained video stream such that video images in the manipulated video stream appear to be taken from the perspective of the imaginary camera and not from the perspective of the camera coupled to the computing device, wherein manipulating the obtained video stream comprises:

manipulating the first set of images in the video stream such that the eyes of the user, as depicted in the manipulated first set of images in the video stream, appear to be gazing at the eyes of the remote user;

manipulating the second set of images in the video stream such that the eyes of the user, as depicted in the manipulated second set of images in the video stream, appear to be gazing at the additional location;

a transmission module, stored in memory, that transmits the manipulated video stream of the user to the remote computing device of the remote user;

at least one physical processor configured to execute the detection module, the identification module, the creation module, and the transmission module.

12. The system of claim 11, wherein the transmission module transmits the manipulated video stream to the remote computing device by transmitting the manipulated video stream in real time.

13. The system of claim 11, wherein the creation module:
determines that the user is gazing at the additional location by identifying a distance between the location on the computing device's screen where the eyes of the remote user are displayed and the additional location;
manipulates the second set of images in the video stream by creating, in the second set of images in the video stream, an angle offset for the gaze of the user that reflects the identified distance.

14. The system of claim 13, wherein the creation module identifies the distance between the location on the computing device's screen where the eyes of the remote user are displayed and the additional location by identifying at least one of:
a magnitude of the distance;
a direction of the distance.

15. The system of claim 13, wherein the creation module creates the angle offset for the gaze of the user by basing the angle offset on at least one of:
a size of the computing device's screen;
a size of a window comprising the display of the remote user's eyes;
a distance between the user and the computing device;
a distance between the window and the additional location.

16. The system of claim 11, wherein the creation module:
determines that the location on the computing device's screen where the eyes of the remote user are displayed has moved to a new location on the computing device's screen;
changes a locality of the imaginary camera to correspond to the new location.

17. The system of claim 16, wherein the location has moved to the new location as a result of at least one of:
a change in a location of a window comprising the display of the remote user's eyes;
a change in a location of the remote user's eyes within the window.

18. The system of claim 11, wherein the creation module obtains the video stream of the user by obtaining a three-dimensional video stream of the user.

19. The system of claim 18, wherein the creation module manipulates the obtained video stream by:
rotating video images within the three-dimensional video stream such that the rotated video images appear to be taken from the perspective of the imaginary camera;
flattening the rotated images within the three-dimensional video stream to create two-dimensional images that appears to be taken from the perspective of the imaginary camera.

20. A non-transitory computer-readable medium comprising one or more computer-readable instructions that, when executed by at least one processor of a computing device, cause the computing device to:
detect a video conference between a user of the computing device and a remote user of a remote computing device;
identify a location on the computing device's screen where the eyes of the remote user are displayed as part of the video conference;
create a video stream of the user that appears to be taken from the perspective of an imaginary camera located at the eyes of the remote user by:
obtaining, from at least one camera coupled to the computing device, a video stream of the user participating in the video conference, the obtained video stream displaying video images of the user from the perspective of the camera coupled to the computing device;
determining, in a first set of images in the video stream, that the user is looking at the location on the computing device's screen where the eyes of the remote user are displayed;
determining, in a second set of images in the video stream, that the user is looking at an additional location away from the location on the computing device's screen where the eyes of the remote user are displayed;
manipulating the obtained video stream such that video images in the manipulated video stream appear to be taken from the perspective of the imaginary camera and not from the perspective of the camera coupled to the computing device by:
manipulating the first set of images in the video stream such that the eyes of the user, as depicted in the manipulated first set of images in the video stream, appear to be gazing at the eyes of the remote user;
manipulating the second set of images in the video stream such that the eyes of the user, as depicted in the manipulated second set of images in the video stream, appear to be gazing at the additional location;
transmit the manipulated video stream of the user to the remote computing device of the remote user.

* * * * *